United States Patent Office 2,759,962
Patented Aug. 21, 1956

2,759,962

PRODUCTION OF NEW ESTERS OF ORTHO-PHOSPHORIC ACID AND SALTS THEREOF

Henryk Zenftman, Saltcoats, and Edward Whitworth, West Kilbride, Scotland, assignors to Imperial Chemical Industries Limited, a corporation of Great Britain No Drawing. Application May 7, 1951, Serial No. 225,054

Claims priority, application Great Britain May 31, 1950

5 Claims. (Cl. 260—461)

The present invention is concerned with the production of new esters of phosphoric acid.

Some of the new esters obtained according to the process of the present invention are emulsifying agents for forming aqueous emulsions of mineral oils and other liquid hydrocarbons and of triglycerides such an animal and vegetable oils, especially when it is required that the emulsion should be of acid or substantially neutral reaction, while some of the new esters are useful froth flotation agents, and some are useful as agents for improving the lubricating properties of oils to be used under extreme pressure conditions.

The new compounds of the present invention are para-tertiary octyl-aryl esters of phosphoric acid of the general formula:

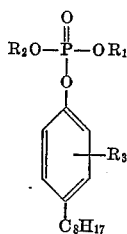

wherein $R_1$ is an alkyl radical having not more than 3 carbon atoms or a hydroxy- or halogen-substituted derivative thereof, $R_2$ is a hydrogen atom or an alkyl radical having not more than 3 carbon atoms or a hydroxy-derivative of such alkyl radical containing not more than 2 hydroxyl groups, and $R_3$ is an optional alkyl substituent in a para-tertiary octyl substituted phenyl radical.

If $R_2$ is a hydrogen atom the new surface-active compounds of the invention include also the corresponding salts of the alkali metals and mono-valent non-metallic bases.

These esters of phosphoric acid may accordingly be of the character of mono-acid esters or alkali metal salts thereof, or of normal phosphoric esters. They may be solids or liquids of low volatility according to the identity of the groups $R_1$ and $R_2$. In general they are slightly soluble in water but easily soluble in ethyl alcohol, aromatic hydrocarbons and various other organic liquids. They are only slightly soluble in cold mineral oils.

According to the present invention the process for the production of esters of aryl phosphoric acid comprises reacting a saturated primary aliphatic alcohol having not more than 3 carbon atoms in the molecule with a para-tertiary octyl-aryloxy-phosphoryl dihalide containing only carbon and hydrogen in its aryl group and removing hydrogen chloride produced in the reaction.

In accordance with one embodiment of the process of the present invention the said alcohol is added to the said dihalide, the mixture thus formed is kept at a temperature which permits reaction to take place, the addition of said alcohol is continued until said dihalide has all reacted, and the hydrogen halide and any volatile organic halide not of ester character produced in the reaction are removed during the reaction.

This embodiment of the invention is suitable for all saturated primary aliphatic alcohols having not more than 3 carbon atoms in the molecule. The resulting product consists in the main of a mixture of mono acid esters and neutral esters, the mono acid esters predominating.

An increase of temperature of the reaction up to an optimum leads to an increase in the ratio of the mono acid ester to the neutral ester and at the optimum temperature for any particular alcohol the product may consist substantially wholly of the mono acid ester.

The temperature at which the reaction takes place is usually not lower than 50° C.

It will be understood that the aforesaid saturated primary aliphatic alcohol may consist either of a single chemical individual or of a mixture of more than one chemical individual, provided that none of them has more than 3 carbon atoms nor more than 3 hydroxyl groups in its molecule. The alcohol may if desired be monohydric e. g. methyl alcohol, ethyl alcohol or normal propyl alcohol, or polyhydric e. g. ethylene glycol, glycerol or trimethylene glycol. Moreover the presence of a halogen substituent in the alcohol is permissible e. g. there may be used ethylene chlorhydrin, or glycerol alpha-chlorhydrin. The para-tertiary octyl-aryloxy-phosphoryl dihalide is preferably the dichloride, e. g. para-tertiary octyl-phenoxy-phosphoryl dichloride, or a para-tertiary octyl-cresoxy-phosphoryl dichloride, but the corresponding dibromides may also be used.

In accordance with another embodiment of the invention when the alcohol having not more than 3 carbon atoms is a monohydric alcohol the said dichloride is added to an excess of said alcohol, the temperature is kept throughout the addition below 10° C., and the product thus formed is subsequently treated with water at least until the hydrogen chloride formed in the reaction is removed.

The resulting product according to this embodiment consists predominantly of neutral esters.

When the saturated primary aliphatic alcohol employed is mono-hydric, the ester product of the reaction may comprise a normal mono-para-tertiary octyl-aryl dialkyl ester of phosphoric acid corresponding to the monohydric alcohol used, and a mono-hydrogen mono-para-tertiary octyl-aryl mono-alkyl ester of phosphoric acid. The formation of each mole of the normal ester is accompanied by the formation of 2 moles hydrogen halide and the formation of the acid ester by the formation of 1 mole each of hydrogen halide and of the alkyl halide corresponding to the monohydric alcohol used.

For that embodiment of the invention according to which the alcohol is added to the dihalide for a polyhydric alcohol e. g. ethylene glycol, the predominating product of the reaction is an acid ester of phosphoric acid wherein one of the two halogen atoms of the original para-tertiary octyl-aryloxy-phosphoryl dihalide is found in the product to have become attached to one of the carbon atoms of the aliphatic ester group which in the original polyhydric alcohol bore a hydroxyl group. The other halogen atom forms a hydrogen halide. Thus on the case of ethylene glycol the predominating product is a para-tertiary octyl-aryl beta-halogen ethyl-ester of phosphoric acid.

The acid esters obtained from either the monohydric or the polyhydric alcohols are more effective emulsifying agents than the normal esters. The normal esters are however very effective as surface tension reducing agents in low concentrations and are useful as additives to increase the quantity of solid fillers in plastic compositions.

When it is required to prepare esters in which the group R₂ is an alkali metal or non-metallic monovalent cation, this may be done by treatment of the acid esters with the appropriate base e. g. an alkali metal hydroxide or carbonate or an appropriate non-metallic base such as ammonia. The resulting normal alkali metal salts are easily soluble in water, are of alkaline reaction and possess good frothing and detergent properties. Less alkaline products are prepared by partial conversion of the free acid into the salts of strong bases e. g. products consisting of the extent of about 95% of the sodium salt and 5% of the free acid having a pH of 7.5 to 8.5, possess still better frothing properties.

The invention is illustrated in the following examples in which the parts are by weight except where otherwise shown.

*Example 1*

To 1 mole para-tertiary octyl-phenoxy-phosphoryl dichloride (boiling point 142° C. at 0.8 mm.), contained in a flask provided with a stirrer and a reflux condenser there is gradually added 2.2 moles methanol, the temperature of the contents being maintained at 65 to 70° C. by heating them on a water bath. The addition of the methanol occupies about 4 hours by which time there is no visible evolution of gases. Heating is continued for a further 2 hours at 80° C., by which time analysis shows that the reaction has proceeded practically to completion. During the reaction hydrogen chloride and methyl chloride are evolved and are led away. After the reaction is complete the reflux condenser is removed and the mixture is heated for 1 hour under reduced pressure (about 15 mm.) to remove the excess of methanol. The resulting product is a water-clear viscous liquid which crystallizes on prolonged standing. Analysis indicates that it consists of a mixture of dimethyl mono-para-tertiary octyl-phenyl phosphate and methyl para-tertiary octyl-phenyl hydrogen phosphate in the approximate proportions 20:80. The product is soluble in alcohol, ether, benzene, toluene, xylene, ligroin and various other organic liquids, and it is only slightly soluble in water and in cold mineral oils.

An 0.1% water solution of this compound has a surface tension of 33.0 dynes/cm. (water 72.9 dynes/cm.) and a 1% solution has an interfacial tension against liquid paraffin of 3.0 dynes/cm. (The interfacial tension of water against liquid paraffin is 39.0 dynes/cm.)

When 3 parts of the product of Example 1 are dissolved in 15 parts medicinal liquid paraffin at 80° C. and the solution is diluted with 85 parts cold mineral oil and added with fast stirring to 100 parts water, there is obtained a stable emulsion which does not separate or cream on standing for 30 days at room temperature.

From the mixed ester product dimethyl para-tertiary octyl-phenyl phosphate is isolated by distillation under 0.1 mm. pressure, as a clear oily distillate $N_D$ 17.5=1.495. Elementary analysis gives C=61.0%, H=8.7%, P=9.6%. The calculated percentages are C=61.2%, H=8.9%, P=9.8%. The methyl para-tertiary octyl-phenyl hydrogen phosphate in the mixed ester product is identified by dissolving the mixture in alcohol and precipitating the barium salt of the acid ester. On analysis the barium salt is found to contain 18.2% barium and 8.1% phosphorus. The calculated percentages of barium and phosphorus are respectively 18.7 and 8.4.

*Example 2*

To 1 mole para-tertiary octyl-phenoxy-phosphoryl dichloride contained in a flask provided with a stirrer and a reflux condenser there is gradually added 1 mole ethylene glycol over a period of 4½ hours, while the temperature is maintained, by heating on a water bath, at 80 to 100° C. By this time the elimination of hydrogen chloride has ceased and the amount evolved is approximately 1 mole. The resulting ester product is a water-clear viscous liquid which on analysis is found to consist to the extent of more than 90% of hydrogen beta-chloroethyl para-tertiary octyl-phenyl phosphate. The chlorine contained in this product is not hydrolyzed when the product is stored in solution in aqueous alcohol and titrated with cold alcoholic potassium hydroxide, and amounts to 9.35%. The product has emulsifying properties generally very similar to that of the mixed ester product described in Example 1.

*Example 3*

The preparation is carried out in a manner similar to that described in Example 1 except that ethyl alcohol is substituted for methanol and that stirring is carried out by passing carbon dioxide through the mixture and the temperature at which the reaction mixture is maintained during the addition of the ethyl alcohol is 65° C. The product obtained is a clear colourless liquid consisting substantially of a mixture of diethyl para-tertiary octyl-phenyl phosphate and hydrogen ethyl para-octyl-phenyl phosphate in the ratio of approximately 40:60. Its emulsifying properties are generally similar to that of the mixed product described in Example 1.

*Example 4*

To produce a neutral product from the mixed ester product obtained according to Example 1 by neutralizing the acid ester component with sodium hydroxide 100 parts of the said mixed ester product are treated at 50° to 150° C. with a solution of 10 parts sodium hydroxide in 2½ times its weight of water. The mixture warms up during the addition of the sodium hydroxide solution and is cooled to maintain its temperature below 65° C. A thick sticky slurry is obtained which on drying under reduced pressure at a temperature of 95° C. gives a solid product which dissolves in water giving a soapy solution that foams profusely when shaken. A 2% aqueous solution of the solid product has a pH of 8.1. This product is also useful for increasing and stabilizing the foam produced by commercial detergents.

*Example 5*

700 grams of para-octyl-phenoxy-phosphoryl dichloride are added gradually to 500 grams of absolute ethyl alcohol with stirring, the mixture being cooled with ice-water so as to maintain the temperature of the reaction at 5° C. approximately. After the introduction of the dichloride the mixture is stirred for a further 4 hours and allowed gradually to reach room temperature. It is left for 18 hours and then poured with stirring into a 5 litre beaker containing 2 litres of water and ice. An oily clear liquid separates at the bottom of the beaker. It is washed with water until the wash water is free from hydrogen chloride. During the last washes the product has a tendency to emulsify in water, but it can be separated by adding sodium chloride to the mixture. After clarification by filtration through a moisture absorbing filter a water-clear liquid is obtained with an acid number of about 10 and containing about 95% of diethyl para-tertiary octyl-phenyl phosphate.

The product is only slightly soluble in water but an 0.001% solution of this compound in water reduces the surface tension of water from 72.9 dynes/cm. to 38.4 dynes/cm.

*Example 6*

The procedure is the same as in Example 1 except that the temperature of reaction is 75° and that the heating is continued for 4 hours at 85°. The product consists of 97% monomethyl paratertiary octyl phenyl hydrogen phosphate and is a white crystalline substance having a setting point of 86° C., an acid number of 180, and a methoxyl content of 10%. Colourless diamond shaped crystal flakes M. P. 94° C. are obtained on recrystallization from ligroin. Elementary analysis gives C—60.1%, H—8.6%, P—10.4%. Calculation for $C_{15}H_{25}PO_4$ gives C—60.0%, H—8.3%, P—10.3%.

An aqueous solution having a concentration of 0.01 g./litre has a surface tension of 53.5 dynes/cm. A concentration of 0.1 g./litre has a surface tension of 41.1 dynes/cm. and a concentration of 1 g./litre has a surface tension of 33.6 dynes/cm.

The sodium salt obtained by treating the product with sodium hydroxide is readily soluble in water and surfaces e. g. fibrous surfaces coated with a solution of this salt have after drying an increased coefficient of friction.

The surface tension in dynes per square centimeter of aqueous solutions of the salt at different concentrations is given in the following table.

| Concentration in grams per litre | Surface tension |
|---|---|
| 0.001 | 68.1 |
| 0.01 | 57.9 |
| 0.1 | 41.1 |
| 1.0 | 35.3 |

What we claim is:

1. Para-tertiary octyl-aryl esters of phosphoric acid of the general formula:

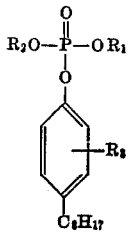

wherein $R_1$ is an alkyl radical selected from the group consisting of alkyl radicals having not more than 3 carbon atoms and hydroxy- and halogen-substituted derivatives thereof, $R_2$ is a radical selected from the group consisting of hydrogen-, and alkyl radical having not more than 3 carbon atoms, hydroxy derivatives of said alkyl radicals containing not more than 2 hydroxyl groups alkali metals, and ammonia, and $R_3$ is a radical selected from the group consisting of hydrogen- and alkyl radical.

2. Para-tertiary octyl phenyl dimethyl phosphate.

3. Para-tertiary octyl phenyl diethyl phosphate.

4. Mono-methyl para-tertiary octyl phenyl hydrogen phosphate.

5. Para-tertiary octyl-aryl esters of phosphoric acid as claimed in claim 1 in which $R_2$ is a mono-hydroxy alkyl radical having not more than 3 carbon atoms in the molecule.

References Cited in the file of this patent

UNITED STATES PATENTS

| | | |
|---|---|---|
| 1,869,768 | Nicolai | Aug. 2, 1932 |
| 2,071,017 | Bass | Feb. 16, 1937 |
| 2,250,662 | Walter | July 29, 1941 |
| 2,285,854 | Downing | June 9, 1942 |
| 2,340,331 | Knutson | Feb. 1, 1944 |
| 2,656,374 | Gamrath | Oct. 20, 1953 |
| 2,678,329 | Gamrath | May 11, 1954 |
| 2,694,689 | Gamrath | Nov. 16, 1954 |